United States Patent
Fanelli

(10) Patent No.: US 8,667,995 B1
(45) Date of Patent: Mar. 11, 2014

(54) INSULATED DUCTS AND INSULATED DUCTWORKS

(71) Applicant: Carl Fanelli, Mahopac, NY (US)

(72) Inventor: Carl Fanelli, Mahopac, NY (US)

(*) Notice: Subject to any disclaimer, the term of this patent is extended or adjusted under 35 U.S.C. 154(b) by 0 days.

(21) Appl. No.: 13/849,644

(22) Filed: Mar. 25, 2013

Related U.S. Application Data

(60) Provisional application No. 61/650,583, filed on May 23, 2012.

(51) Int. Cl.
*F16L 9/18* (2006.01)

(52) U.S. Cl.
USPC .................. 138/112; 138/115; 138/149

(58) Field of Classification Search
USPC .......................... 138/112, 115, 149
See application file for complete search history.

(56) References Cited

U.S. PATENT DOCUMENTS

| | | | |
|---|---|---|---|
| 2,936,792 A | 5/1960 | MacCracken et al. | |
| 3,175,586 A * | 3/1965 | Tatsch | 138/137 |
| 3,649,398 A * | 3/1972 | Keith | 156/79 |
| 4,590,971 A * | 5/1986 | Webster et al. | 138/149 |
| 4,615,411 A | 10/1986 | Breitscheidel et al. | |
| 5,020,481 A * | 6/1991 | Nelson | 122/494 |
| 5,219,403 A | 6/1993 | Murphy | |
| 5,918,644 A * | 7/1999 | Haack et al. | 138/151 |
| 6,199,595 B1 * | 3/2001 | Baker | 138/149 |
| 6,230,750 B1 | 5/2001 | Lessard et al. | |
| 6,527,013 B2 | 3/2003 | Somerville et al. | |
| 6,564,831 B1 * | 5/2003 | Sanoner et al. | 138/115 |
| 6,579,170 B1 | 6/2003 | Davis | |
| 7,622,683 B2 * | 11/2009 | Corbishley | 174/137 R |
| 7,699,078 B1 | 4/2010 | Husmann, Jr. | |
| 8,186,387 B2 * | 5/2012 | Wadsworth | 138/149 |
| 2002/0100517 A1 * | 8/2002 | Somerville et al. | 138/148 |
| 2003/0051764 A1 * | 3/2003 | Jungers | 138/149 |
| 2010/0089483 A1 | 4/2010 | Dudley et al. | |
| 2010/0282356 A1 * | 11/2010 | Sawyer, Sr. | 138/149 |

* cited by examiner

*Primary Examiner* — James Hook
(74) *Attorney, Agent, or Firm* — Goldstein Law Offices, P.C.

(57) ABSTRACT

A duct for use in an HVAC system is provided. The duct including an outer tube. The duct also including an inner tube capable of conveying forced air. The inner tube extending within the outer tube and along the outer tube. The duct further including a plurality of support elements spanning between the outer tube and the inner tube. The elements extending along the inner tube and the outer tube. The elements defining a plurality of channels between the outer tube and the inner tube. The outer tube, the inner tube and the elements are unitary.

21 Claims, 4 Drawing Sheets

INSULATED DUCTS AND INSULATED DUCTWORKS

CROSS-REFERENCE TO RELATED APPLICATIONS

The present application claims priority to U.S. Provisional Patent Application Ser. No. 61/650,583, filed on May 23, 2012, which is herein incorporated by reference in its entirety for all purposes.

TECHNICAL FIELD

Generally, the present disclosure relates to heating, ventilation and air conditioning (HVAC) ducts. More particularly, the present disclosure relates to HVAC duct insulation.

BACKGROUND

In the present disclosure, where a document, an act and/or an item of knowledge is referred to and/or discussed, whether directly and/or indirectly, then this reference and/or discussion is not an admission that the document, the act and/or the item of knowledge and/or any combination thereof was at the priority date, publicly available, known to the public, part of common general knowledge and/or otherwise constitutes prior art under the applicable statutory provisions and/or is known to be relevant to any attempt to solve any problem with which the present disclosure is concerned.

HVAC systems are generally used to control various aspects of indoor air environment. In order to conduct air within the HVAC system, a ductwork is typically used. The ductwork usually includes a plurality of interconnected sectioned ducts. A common type of such duct is fabricated from a single-walled sheet metal formed into a plurality of conduits having rectangular or circular cross-sections.

Many jurisdictions have legal codes, such as building codes, regulating construction and maintenance of buildings located within the jurisdictions. In order to promote efficient energy use, some of such codes require the ductwork to be insulated at least during building construction. Such insulation limits thermal energy transfer between the air within the ductwork and the air outside the ductwork.

A typical ductwork insulation process involves wrapping fiberglass insulation jacket around many, if not all, ducts within the ductwork and taping the seams to seal. The HVAC system is then pressure tested to ensure absence of air leaks within the ductwork. Although such insulation method is relatively effective, the method can be time consuming and costly to implement. A more efficient technology for insulating ducts and ductworks is thus desired.

While certain aspects of conventional technologies have been discussed to facilitate the present disclosure, no technical aspects are disclaimed. The claims may encompass one and/or more of the conventional technical aspects discussed herein.

BRIEF SUMMARY

The present disclosure addresses at least one of the above. However, the present disclosure may prove useful in addressing other problems and/or deficiencies in a number of technical areas. Therefore, the claims, as recited below, should not be construed as necessarily limited to addressing any of the particular problems and/or deficiencies discussed herein.

According to an example embodiment of the present disclosure a duct for use in an HVAC system is provided. The duct including an outer tube. The duct also including an inner tube capable of conveying forced air. The inner tube extending within the outer tube and along the outer tube. The duct further including a plurality of support elements spanning between the outer tube and the inner tube. The elements extending along the inner tube and the outer tube. The elements defining a plurality of channels between the outer tube and the inner tube. The outer tube, the inner tube and the elements are unitary.

According to another example embodiment of the present disclosure a duct for use in an HVAC system is provided. The duct including an outer tube having an interior space and a first open end. The duct also including an inner tube capable of conveying forced air. The inner tube extending within the interior space and along the outer tube. The inner tube having a second open end in proximity of the first end. The duct further including a thermally insulating layer partially filling the interior space. The layer recessed with respect to the first open end and the second open end.

According to yet another example embodiment of the present disclosure a ductwork for use in an HVAC system is provided. The ductwork including a first duct including a first outer tube and a first inner tube capable of conveying forced air. The first inner tube extending within the first outer tube and along the first outer tube. The first duct including a plurality of support elements spanning between the first outer tube and the first inner tube. The elements extending along the first inner tube and the first outer tube. The elements defining a plurality of channels between the first outer tube and the first inner tube. The channels are filled with a plurality of thermally insulating layers. The ductwork also including a second duct including a second outer tube having an interior space and a first open end. The second duct including a second inner tube capable of conveying the forced air. The second inner tube extending within the interior space and along the second outer tube. The second inner tube having a second open end in proximity of the first end. The second duct including a thermally insulating layer partially filling the interior space. The layer recessed with respect to the first open end and the second open end. The second outer tube wider than the first outer tube. The first outer tube, the first inner tube and the elements are unitary. The layers are in contact with the layer. The first inner tube in fluid communication with the second inner tube. The first outer tube partially within the interior space.

Additional features and advantages are realized through the techniques of the present disclosure. The present disclosure may be embodied in the form illustrated in the accompanying drawings. Attention is called to the fact, however, that the drawings are illustrative. Variations are contemplated as being part of the disclosure, limited only by the scope of the claims.

BRIEF DESCRIPTION OF THE DRAWINGS

The accompanying drawings illustrate example embodiments of the present disclosure. Such drawings are not to be construed as necessarily limiting the disclosure. Like numbers can refer to like elements throughout.

DETAILED DESCRIPTION OF THE PREFERRED EMBODIMENTS

Figure 1:
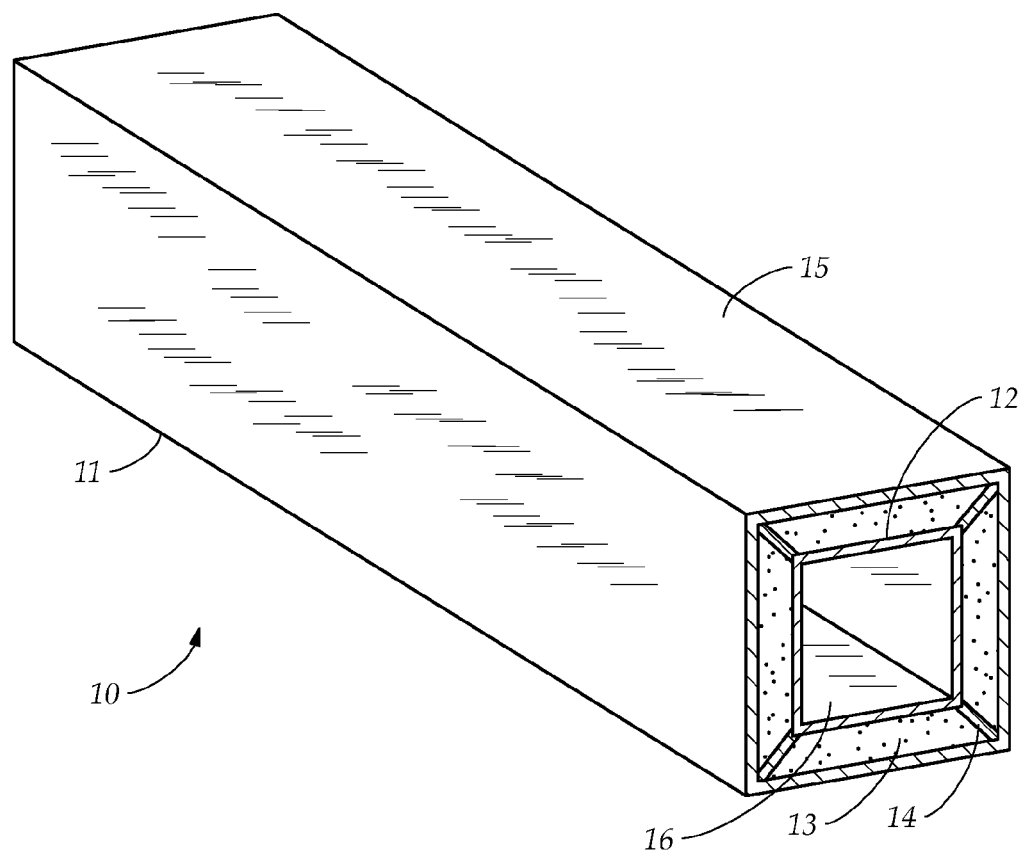
FIG. 1 shows an example embodiment of an insulated duct according to the present disclosure.

The present disclosure will now be described more fully with reference to the accompanying drawings, in which example embodiments of the present disclosure are shown. The present disclosure may, however, be embodied in many different forms and should not be construed as necessarily being limited to the embodiments set forth herein. Rather, these embodiments are provided so that this disclosure will be thorough and complete, and will fully convey the concept of the disclosure to those skilled in the art. Also, features described with respect to certain embodiments may be combined in various other embodiments. Different aspects and elements of the embodiments may be combined in a similar manner. The disclosed embodiments may individually or collectively be components of a larger system.

Any verbs as used herein can imply direct or indirect, full or partial, action or inaction. For example, when an element is referred to as being "on," "connected" or "coupled" to another element, then the element can be directly connected or coupled to the other element or intervening elements may be present. In contrast, when an element is referred to as being "directly connected" or "directly coupled" to another element, there are no intervening elements present.

Although the terms "first," "second," etc. may be used herein to describe various elements, components, regions, layers and/or sections, these elements, components, regions, layers and/or sections should not be necessarily limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in the present disclosure, specify the presence of stated features, integers, steps, operations, elements, and/or components, but do not preclude the presence and/or addition of one and/or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to necessarily limit the scope of the present claims. Any and/or all components and/or materials can be formed from a same, structurally continuous piece and/or be separately manufactured and/or connected.

Unless otherwise defined, all terms (including technical and scientific terms) used herein have the same meaning as commonly understood by one of ordinary skill in the art to which the present disclosure belongs. The terms, such as those defined in commonly used dictionaries, should be interpreted as having a meaning that is consistent with their meaning in the context of the relevant art and will not be interpreted in an idealized or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of the device in addition to the orientation depicted in the accompanying drawings. For example, if the device in the accompanying drawings is turned over, elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

FIG. 1 shows an example embodiment of an insulated duct according to the present disclosure.

A duct 10 is operative for use in an HVAC system in order to conduct forced air. Duct 10 can be effectively insulated according to at least one building code. Such insulation minimizes air leaks. Any portion and/or component of duct 10 can be formed from a same, structurally continuous piece or be separately fabricated and connected. Any portion and/or component of duct 10 can be 3D printed, injection molded or formed via another manufacturing process. Any portion and/or component of duct 10 can include metal, plastic, wood, rubber or any other material, whether rigid or flexible.

Duct 10 includes an outer hollow plastic tube 11, which can be of any size, length, width, depth, volume or any cross-section, such as triangular, circular, oval, rectangular, square, trapezoid and/or any other geometric shape. Tube 11 can be non-plastic based as well, such as metallic. Tube 11 can be straight, curved, wavy and/or bent. Plastic can be biodegradable, flame-retardant and/or leak-proof. Tube 11 can have an external surface 15 with a white reflective portion. However, other colors can be used as well, whether reflective or non-reflective can also be used. Tube 11 can also have at least one aperture for use with a fastener, such as a screw. In one example embodiment, tube 11 is about ⅛ inch thick, about 4 feet long and has an R-value measuring insulation of about 2. In another example embodiment, tube 11 has a square cross-section with each side being 12.5 inches. Tube 11 can be a pipe.

Duct 10 further includes an inner hollow plastic tube 12 inside tube 11. Tube 12 is used for conducting forced air therethrough, such as through the HVAC system. Tube 12 can be of any size, length, width, depth, volume or any cross-section, such as triangular, circular, oval, rectangular, square, trapezoid and/or any other geometric shape. Tube 12 can be non-plastic based as well, such as metallic. Tube 12 can be can be straight, curved, wavy and/or bent. Plastic can be biodegradable, flame-retardant and/or leak-proof. Tube 11 can be as thick as tube 12 or differ in thickness from tube 12. Tube 11 and tube 12 can be identically shaped, such as both being square, or differently shaped from each other, such as one is circular and one is square. Tube 12 can have an internal surface 16 with a bacteria-resistant portion. Tube 11 can have the R-value equal to, less than or greater than tube 12. In one example embodiment, tube 12 is about ⅛ inch thick, about 4 feet long and has the R-value of about 0.5. In another example embodiment, tube 12 has a square cross-section with each side being 10 inches. Tube 12 can be a pipe. Tube 12 and tube 11 can be concentric with each other or non-concentric with each other. Open ends of tubes 11 and 12 can be parallel to each other or non-parallel to each other. For example, layer 13 can be slanted diagonally between the open ends of tubes 11 and 12 such that the open end of tube 11 projects out further than the open end of tube 12.

Duct 10 also includes an insulating foam layer 13 enveloping tube 12. Such envelopment can be full or partial. Alternatively, layer 13 can be non-foam based. Tube 11 envelops layer 13. Such envelopment can be full or partial. Layer 13 can have the R-value of at least about 7. However, the R-value of layer 13 can be lower as well. Layer 13 can be a spray foam filler. Layer 13 can include polyurethane or any equivalent thereof. In one example embodiment, layer 13 is about 1.25 inch thick, about 4 feet long and has the R-value of about 7.5. Layer 13 can be covered by a cover such that layer 13 is not visible when viewed from the front of duct 10.

Tube 11, tube 12 and layer 13 have a combined insulation R-value of at least about 8. Some building codes in some jurisdictions require that all ductwork be insulated to such insulation rating. However, other insulation ratings are possible as well, such as the combined insulation R-value of at most 8.

Duct 10 can include a plurality of support elements 14 spanning through layer 13 between tube 12 and tube 11. Elements 14 can define a plurality of distinct channels or cavities between tube 11 and tube 12, which can be filled with insulating material, such as foam. The channels or the cavities can fully extend between the open ends to allow for fluid communication. The channels or the cavities can be open or closed. Any and/or all of such channels and/or cavities can include and/or even contain identical and/or different insulating materials. Although elements 14 can include plastic, which can be biodegradable, flame-retardant and/or leak-proof, elements 14 can also include other materials, such as metal, wood, rubber and the like. Elements 14 can extend, whether linearly, wavy, curly and/or in any other way, along tube 12 and/or tube 11. Elements 14 can be longer, shorter or identical in length to tube 11 and/or tube 12. On each side of duct 10, there can be one or more elements 14. For example, since duct 10 has a square cross-section, any and/or all sides can have at least one element 14 and another element 14 extending at the corner from tube 12 to tube 11. Tube 11, tube 12 and/or elements 14 can be unitary, such as injected molded or 3D printed. For example, when a mold having tube 11 connected to tube 12 via elements 14 is molded, then the mold can be filled with layer 13 or other insulating materials.

Duct 10 can also include a plurality of rigid, such as plastic, L-shaped corner pieces installed onto one and/or more corners of duct 11 to support the square shape of tube 11. Such pieces can extend along tube 11 or alternatively a plurality of such pieces can be installed onto one and/or more corner sides. Alternatively, corner pieces can be C-shaped or U-shaped when tube is elliptical.

Figure 2:
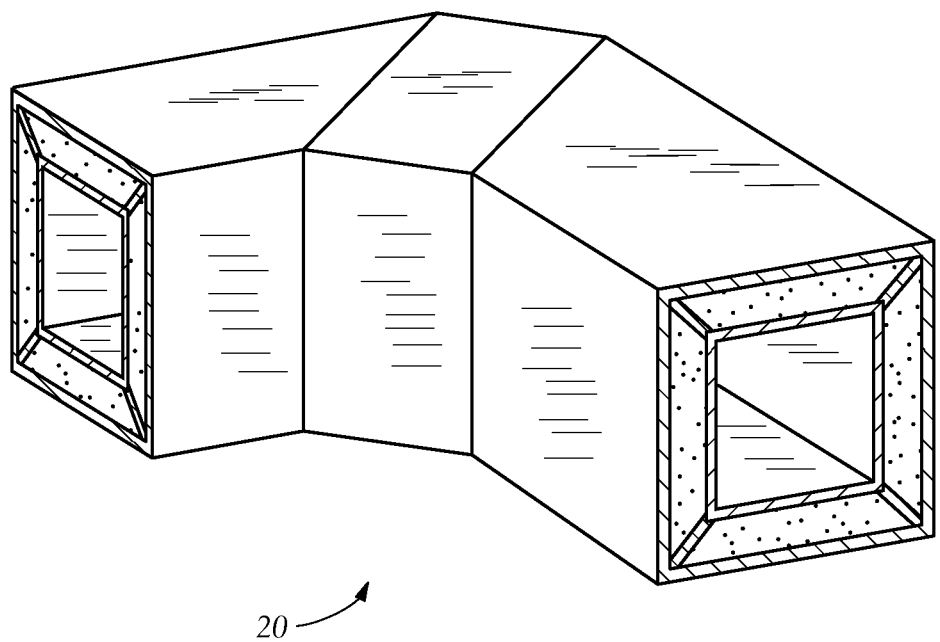
FIG. 2 shows another example embodiment of an insulated duct according to the present disclosure.

FIG. 2 shows another example embodiment of an insulated duct according to the present disclosure. Some elements of this figure are described above. Thus, same reference characters identify same or like components described above and any repetitive detailed description thereof will hereinafter be omitted or simplified in order to avoid complication.

A duct 20 is operative for use in an HVAC system. Duct 20 can be curved as illustrated. Although duct 20 can be structured similarly or identically to duct 10, duct 10 can be different from duct 10. Any portions and/or components of duct 20 can be formed from a same, structurally continuous piece or separately fabricated and connected. Any portion and/or component of duct 20 can be 3D printed, injection molded or formed via another manufacturing process. Duct 20 can be smoothly curved.

Duct 20 can include a gasket comprising of a foam layer having an adhesive on both sides for adhering to other foam layers from mating ducts. The gasket creates a flush seal, which fills the space between the mating ducts in order to effectively minimize air leakage from or into the joined ducts, while conducting the forced air. The gasket can be similar to a duct disclosed and described with reference to FIG. 3. Duct 20 can conducts the forced air, while effectively insulating according to some building code and minimizing air leaks.

Figure 3:
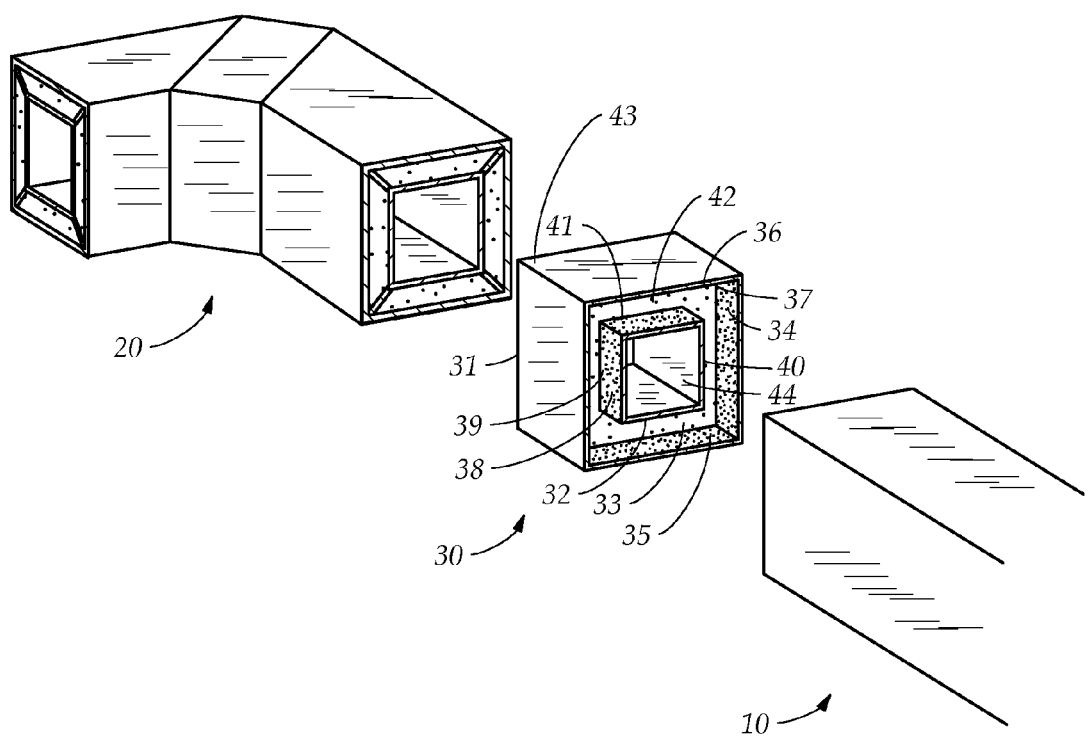
FIG. 3 shows an example embodiment of an intermediate duct before use with a pair of insulated ducts according to the present disclosure.

FIG. 3 shows an example embodiment of an intermediate duct before use with a pair of insulated ducts according to the present disclosure. Some elements of this figure are described above. Thus, same reference characters identify same or like components described above and any repetitive detailed description thereof will hereinafter be omitted or simplified in order to avoid complication.

A duct 30 is operative for use in an HVAC system. Any portions and/or components of duct 30 can be formed from a same, structurally continuous piece or separately fabricated and connected. Any portions and/or components of duct 30 can be 3D printed, injection molded or formed via another manufacturing process. Any portion and/or component of duct 30 can be of any size, length, width, depth, volume and/or any cross-section, such as triangular, circular, oval, rectangular, square, trapezoid and/or any other geometric shape. Any portion and/or component of duct 30 can include metal, wood, rubber, plastic and/or other materials. When duct 30 includes plastic, then such plastic can be biodegradable, flame-retardant and/or leak-proof. Any portion and/or component of duct 30 can be similar or identical to duct 10 and/or duct 20 or be different from duct 10 and/or duct 20. Duct 30 can function as a gasket to effectively minimize air leaks.

Duct 30 includes an outer hollow tube 31 having an interior surface 34, which can fully or partially extend between two open ends of tube 31. Although tube 31 can include plastic, tube 31 can include other materials, such as wood, metal, rubber and/or others. Surface 34 has a pair of side regions 35, 36 and a pair of middle regions 37 therebetween. Regions 35, 36 and/or regions 37 can fully extend along surface 34. However, regions 35, 36 and/or region 37 can also partially extend along surface 34. Tube 31 can have an external surface 43 with a white reflective portion. Tube 31 can also have at least one aperture for use with a fastener, such as a screw.

Duct 30 further includes an inner hollow tube 32 having an exterior surface 38, which can extend between two open ends of tube 32. Although tube 32 can include plastic, tube 32 can include other materials, such as wood, metal, rubber and/or others. Surface 38 has a pair of side areas 39, 40 and a pair of middle areas 41 therebetween. Areas 39, 40 and/or areas 41 can fully extend along surface 38. However, areas 39, 40 and/or areas 41 can also partially extend along surface 38. Tube 32 extends along inside tube 31. Region 37 opposes area 41 and regions 35, 36 oppose areas 39, 40.

Tube 32 is used for conducting forced air therethrough. Tube 32 can have an internal surface 44 with a bacteria-resistant portion. Regions 35, 36 and areas 39, 40 can be adhesively coated for adhering to materials, such as plastic of other ducts. Tube 31 can have the R-value greater than tube 32. Alternatively, tube 31 can have the R-value lesser than tube 32.

Duct 30 also includes a foam layer 33 filled within space between tubes 31 and 32. Layer 33 can partially fills such space. Layer 33 is recessed with respect to the open ends of tube 31 and/or tube 32. Alternatively, layer 33 can be recessed only on one end of tube 31 and/or tube 32. Such recessing can be present on both ends of duct 30 and/or can allow for acceptance of straight or curved ducts, like ducts 10 and/or duct 20. Such recessing can be linear or diagonal, whether upwardly or downwardly. Such recessing can also be smooth, wavy, zigzag or any other pattern. Layer 33 partially envelops tube 32. Such partial envelopment can be identical on both open ends of tube 32 or different on both open ends of tube 32. Tube 31 fully envelops layer 33. Enveloping can include surrounding.

Layer 33 has portions 42 exposed to regions 35, 36, 37 and areas 39, 40, 41. Portions 42 are adhesively coated for adhering to another foam layer and can create a seal to effectively reduce air leaks of the forced air. Layer 33 can include polyurethane. Layer 33 can have the R-value of at least about 7. Alternatively, layer 33 can have the R-value of at most of about 7. Tube 31, tube 32 and layer 33 can have a combined R-value of at least about 8. Layer 33 can have at least one element 14, such as duct 10 or duct 20. Alternatively, layer 33 can lack any elements 14.

Duct 30 can include a plurality of support elements extending through layer 33 from tube 32 to tube 31, similarly to ducts 10 and/or 20. The elements can include plastic and extend along tube 32. Tube 31, tube 32, layer 33 and the elements can be unitary. Duct 30 can conduct the forced air, while effectively insulating according to some building code and minimizing air leaks.

Figure 4:
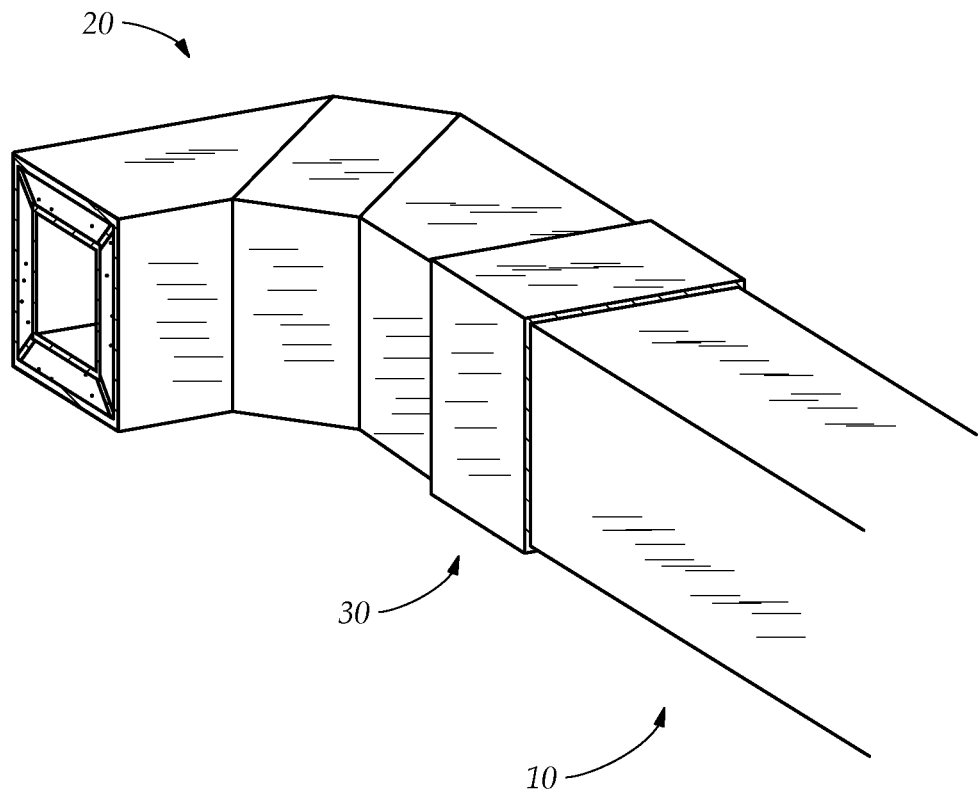
FIG. 4 shows an example embodiment of a ductwork employing an intermediate duct according to the present disclosure.

FIG. 4 shows an example embodiment of a ductwork employing an intermediate duct according to the present disclosure. Some elements of this figure are described above. Thus, same reference characters identify same or like components described above and any repetitive detailed description thereof will hereinafter be omitted or simplified in order to avoid complication.

A ductwork, as shown, includes ducts 10, 20 and 30 is operative for use in an HVAC system. Portions 42 are in adhesive contact with the first layer and the second layer 13 of ducts 10 and 20.

Tube 31 has a larger perimeter than tube 11 and of duct 10 tube 11 of duct 20 in order to fit over tube 11 of duct 10 and tube 11 of duct 20. Tube 32 has a smaller perimeter than tube 12 of duct 10 and tube 12 of duct 20 in order to fit into tube 12 of duct 10 and tube 12 of duct 20. Tube 12 of duct 10 is in fluid communication with tube 12 of duct 20 via tube 32. Alternatively, tube 31 and/or tube 32 has a smaller and/or larger perimeter than tubes 11 and/or 12 of ducts 10 and/or 20.

The description of the present disclosure has been presented for purposes of illustration and description, but is not intended to be fully exhaustive and/or necessarily limited to the disclosure in the form disclosed. Many modifications and variations in techniques and structures will be apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of this application.

What is claimed is:

1. An HVAC duct for use in an HVAC system, the duct comprising:
    an outer tube having a fully continuous external perimeter;
    an inner tube capable of conveying forced air, the inner tube extending within the outer tube and along the outer tube;
    a plurality of support elements spanning between the outer tube and the inner tube, the elements extending along the inner tube and the outer tube lengthwise, the elements defining a plurality of channels between the outer tube and the inner tube, wherein the outer tube, the inner tube and the elements are fully unitary, wherein the channels containing a plurality of thermally insulating layers, wherein the outer tube, the inner tube, and at least one of the layers having a combined R-value between about 8 and about 12, wherein the outer tube having an R-value greater than the inner tube, the at least one of the layers having an R-value between about 7 and about 10, the outer tube having an external surface with a white reflective area.

2. The duct of claim 1, wherein at least one of the inner tube, the outer tube, and at least one of the elements including plastic, the at least one of layers including polyurethane foam.

3. The duct of claim 1, wherein the outer tube having a substantially identical thickness as the inner tube, the inner tube having an internal surface with a bacteria-resistant area.

4. The duct of claim 1, wherein the outer tube including at least one of a linear section and a corner section.

5. The duct of claim 1, wherein the outer tube contains at least two sides substantially parallel to each other.

6. The duct of claim 1, wherein the outer tube and the inner tube are shaped differently from each other.

7. The duct of claim 1, wherein the outer tube and the inner tube are shaped identically to each other.

8. The duct of claim 1, wherein the outer tube having an inner corner, the inner tube having an outer corner, at least one of the elements spanning between the inner corner and the outer corner.

9. The duct of claim 1, wherein the outer tube includes an external corner, the outer tube having a corner piece installed onto the corner, the corner piece configured for providing support to the outer tube.

10. The duct of claim 1, wherein the inner tube is shaped for conveying the forced air about 90 degrees from input of the forced air into the inner tube to output of the forced air from the inner tube.

11. An HVAC duct for use in an HVAC system, the duct comprising:
    an outer tube having an interior space and a first open end, the outer tube having a fully continuous external perimeter;
    an inner tube capable of conveying forced air, the inner tube extending within the interior space and along the outer tube, the inner tube having a second open end in proximity of the first end;
    a thermally insulating layer partially filling the interior space, the layer recessed inwardly with respect to the first open end and the second open end, wherein the outer tube, the inner tube, and the layer having a combined R-value between about 8 and about 12, wherein the outer tube having an R-value greater than the inner tube, wherein the layer having an R-value between about 7 and about 10, wherein the outer tube having an external surface with a white reflective portion.

12. The duct of claim 11, wherein the outer tube having an interior surface, the inner tube having an exterior surface, a portion of at least one of the interior surface and the exterior surface is adhesively coated, the portion lacking the layer thereon.

13. The duct of claim 11, wherein the layer is adhesively coated for adhering to another thermally insulating layer of another duct.

14. The duct of claim 11, further comprising a plurality of support elements spanning between the outer tube and the inner tube, the elements extending along the inner tube and the outer tube lengthwise, the elements defining a plurality of channels between the outer tube and the inner tube, wherein the outer tube, the inner tube and the elements are fully unitary, the channels containing the layer.

15. The duct of claim 11, wherein the inner tube having an internal surface with a bacteria-resistant portion, the layer including polyurethane foam.

16. The duct of claim 11, wherein the outer tube including at least one of a linear section and a corner section.

17. An HVAC ductwork for use in an HVAC system, the ductwork comprising:
 a first HVAC duct including a first outer tube and a first inner tube capable of conveying forced air, the first outer tube having a first fully continuos external perimeter, the first inner tube extending within the first outer tube and along the first outer tube, the first duct including a plurality of support elements spanning between the first outer tube and the first inner tube, the elements extending along the first inner tube and the first outer tube lengthwise, the elements defining a plurality of channels between the first outer tube and the first inner tube, the channels containing a plurality of thermally insulating layers, wherein the first outer tube, the first inner tube, and at least one of the layers having a combined R-value between about 8 and about 12, wherein the outer tube having an R-value greater than the first inner tube, the at least one of the layers having an R-value between about 7 and about 10, the first outer tube having an external surface with a white reflective area;
 a second HVAC duct including a second outer tube having an interior space and a first open end, the second outer tube having a second fully continuous external perimeter, the second duct including a second inner tube capable of conveying the forced air, the second inner tube extending within the interior space and along the second outer tube, the second inner tube having a second open end in proximity of the first end, the second duct including a thermally insulating layer partially filling the interior space, the layer recessed inwardly with respect to the first open end and the second open end, the second outer tube wider than the first outer tube,
 wherein the first outer tube, the first inner tube, and the elements are fully unitary, the layers are in contact with the layer, the first inner tube in fluid communication with the second inner tube, the first outer tube partially within the interior space.

18. The ductwork of claim 17, wherein the second outer tube having an interior surface, the second inner tube having an exterior surface, a portion of at least one of the interior surface and the exterior surface is adhesively coated, the portion lacking the layer thereon.

19. The ductwork of claim 17, wherein the layer is adhesively coated for adhering to the layers.

20. The ductwork of claim 17, wherein the second outer tube, the second inner tube, and the layer having a combined R-value between about 8 and about 12, the second outer tube containing an aperture configured for use with a fastener.

21. The ductwork of claim 17, wherein the first duct including at least one of a linear section and a corner section.

\* \* \* \* \*